United States Patent [19]
Viletto

[11] Patent Number: 5,475,626
[45] Date of Patent: Dec. 12, 1995

[54] PORTABLE COMPUTER WITH A SIMPLE POWER SUPPLY CONTROL OF CHARGEABLE AND NON-RECHARGEABLE BATTERY PACKS

[75] Inventor: Giacomo Viletto, Maglione, Italy

[73] Assignee: Ing. C. Olivetti & C., S.p.A., Ivrea (Torino), Italy

[21] Appl. No.: 22,495

[22] Filed: Feb. 25, 1993

[30] Foreign Application Priority Data

Mar. 12, 1992 [IT] Italy ................................ TO92U0062

[51] Int. Cl.$^6$ .................................................. G06F 1/00
[52] U.S. Cl. ........................................ 364/708.1; 361/680
[58] Field of Search ................................ 364/708.1, 707, 364/709.11, 710.12; 361/680–683, 685; 395/2.1, 2.79, 2.81; 381/51, 36

[56] References Cited

U.S. PATENT DOCUMENTS

| | | | |
|---|---|---|---|
| 4,769,764 | 9/1988 | Levanon | 364/708.1 |
| 4,776,016 | 10/1988 | Hansen | 395/2 |
| 5,030,128 | 7/1991 | Herron et al. | 364/708.1 |
| 5,132,876 | 7/1992 | Ma | 364/708.1 X |
| 5,175,672 | 12/1992 | Conner et al. | 361/680 |
| 5,191,617 | 3/1993 | Bolin et al. | 381/51 |
| 5,200,913 | 4/1993 | Hawkins et al. | 361/681 |
| 5,239,495 | 8/1993 | Nanno et al. | 364/708.1 |
| 5,251,105 | 10/1993 | Kobayashi et al. | |
| 5,289,339 | 2/1994 | Akashi et al. | 361/684 |

FOREIGN PATENT DOCUMENTS

| | | |
|---|---|---|
| 0435317 | 7/1991 | European Pat. Off. |
| 4120968 | 1/1992 | Germany . |
| WO90/16088 | 12/1990 | WIPO . |

*Primary Examiner*—Tan V. Mai
*Attorney, Agent, or Firm*—Banner & Allegretti, Ltd.

[57] ABSTRACT

A portable computer consists of a base unit within which an electronic unit is housed along with two power supply conductors for the electronic unit. The base unit includes a housing to receive a battery pack with terminals for connection to the power supply conductors. The battery pack contains rechargeable batteries. A power supply control circuit is also connected to the conductors and this includes a recharging circuit. When power is applied via an external socket to the base unit the control circuit and recharging circuit are activated. A sensor device is responsive to the presence of the battery pack to supply the recharging current to the rechargeable batteries. When non-rechargeable batteries are inserted in the housing no recharging current is supplied to them.

6 Claims, 7 Drawing Sheets

PORTABLE COMPUTER WITH A SIMPLE POWER SUPPLY CONTROL OF CHARGEABLE AND NON-RECHARGEABLE BATTERY PACKS

FIELD OF THE INVENTION

The present invention relates to a self-powered portable computer comprising a base unit, an electronic unit contained inside the base unit and having a plurality of electronics components and two power supply conductors for the electronic unit, in which the base unit comprises a housing able to house a battery pack having two terminals which can be connected to the two power supply conductors in order to power the electronic unit and in which the battery pack comprises a case containing rechargeable batteries.

BACKGROUND OF THE INVENTION

A portable computer of this type is known from European Patent Application No. 0419177, in which, in order to recharge the batteries, the battery pack has to be removed from the computer and the batteries recharged using a special recharging device. Moreover, this computer does not offer the option of using individual, non-rechargeable batteries. Its scope for use is thus limited, for example when once the batteries have run down, a second battery pack containing charged batteries is unavailable.

SUMMARY OF THE INVENTION

Preferred embodiments of the present invention provide a portable computer which can be powered reliably using a pack of rechargeable batteries, using an external power unit for recharging the battery packs, and which also offers the option of using commercially available, non-rechargeable batteries.

One preferred embodiment of the present invention provides a portable computer which is characterised by a power supply control circuit connected to its power supply conductors in order to power the electronic components with suitable voltages, and a recharging circuit to generate a given recharging current. The computer also comprises a power socket which can be connected to an external power unit in order to power the control circuit, and activate the recharging circuit and to a sensor device which can detect the presence of the battery pack in the housing of the base unit, so as to make the recharging current of the power supply control circuit available to the rechargeable batteries. The housing of the base unit can house a plurality of single non-rechargeable batteries as an alternative to the battery pack, and the sensor device does not respond to the presence of single batteries in the said housing and thus damaging attempts at recharging the non-rechargeable batteries are prevented.

The housing of the base unit can carry intermediate conductors which suitably connect the non-rechargeable batteries together and to the power supply conductors.

The present invention is defined in its various aspects in the appended claims to which reference should now be made.

BRIEF DESCRIPTION OF THE DRAWINGS

Preferred embodiments will now be described in detail by way of example with reference to the appended drawings in which.

DETAILED DESCRIPTION OF PREFERRED EMBODIMENTS

Figure 1:
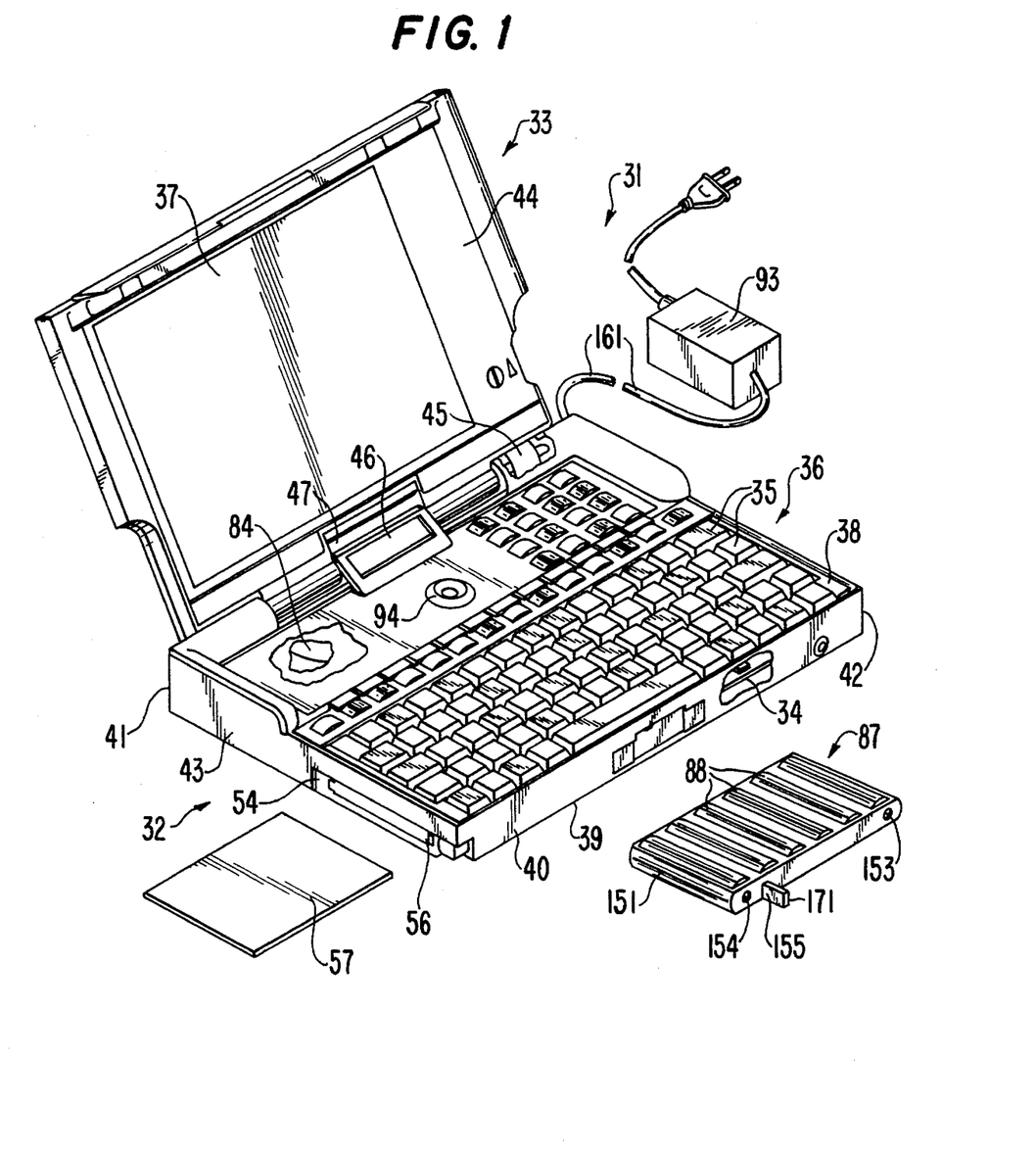
FIG. 1 is a perspective view of a self-powered portable computer embodying the invention, in an open configuration.
Figure 2:
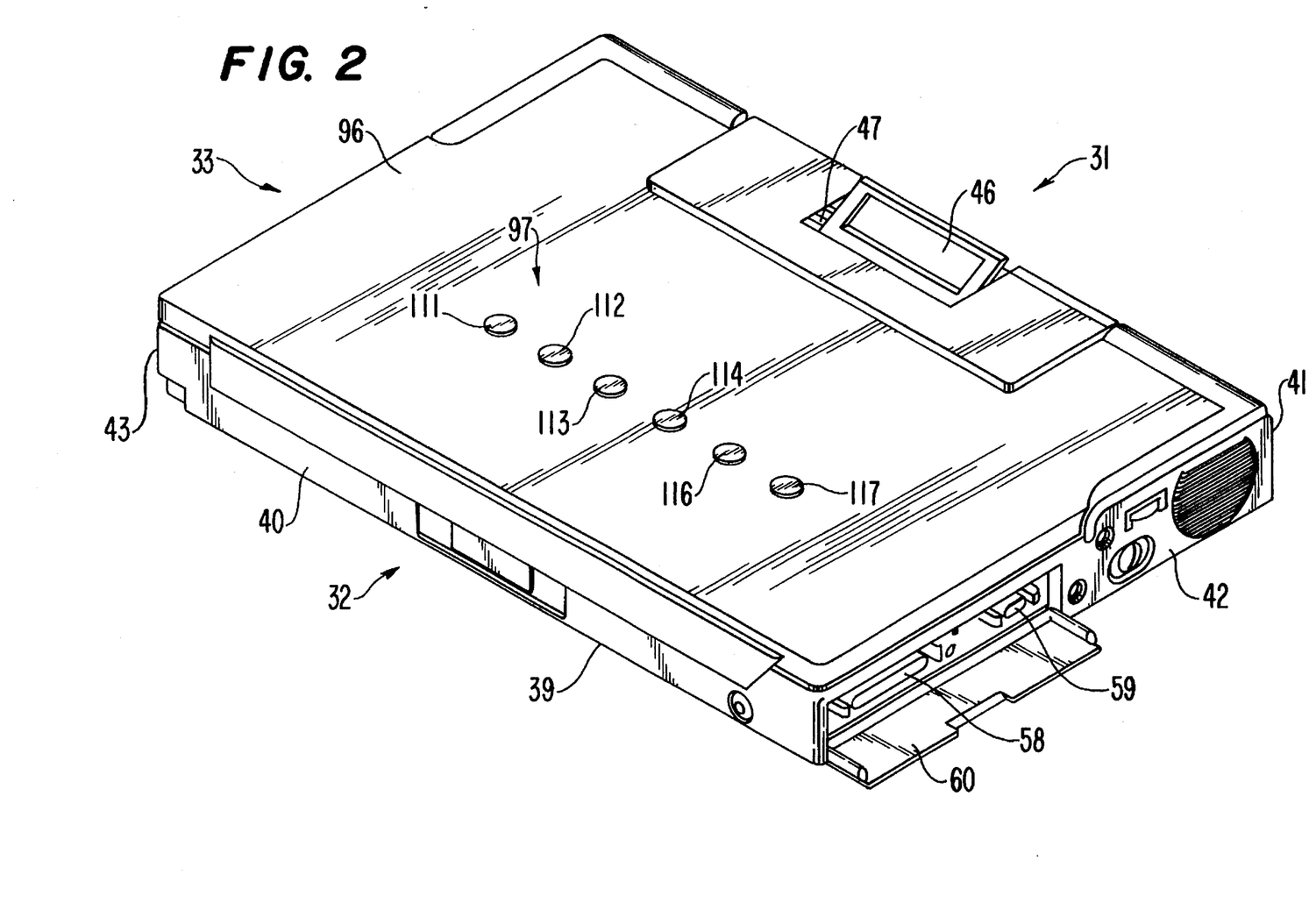
FIG. 2 is a perspective view of the computer of FIG. 1 in a closed configuration and to a different scale.
Figure 3:
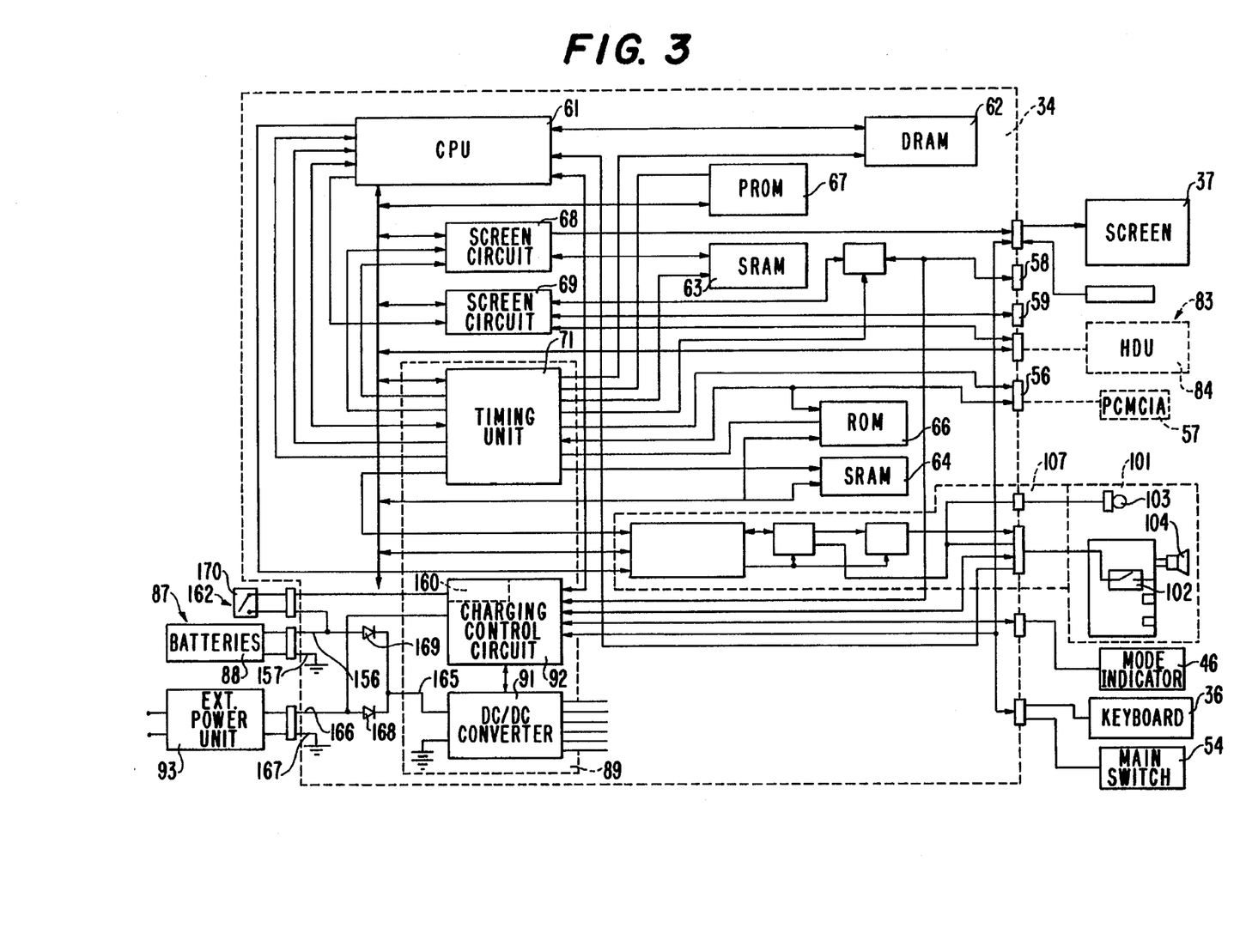
FIG. 3 is a block diagram of the computer in FIG. 1.
Figure 4:
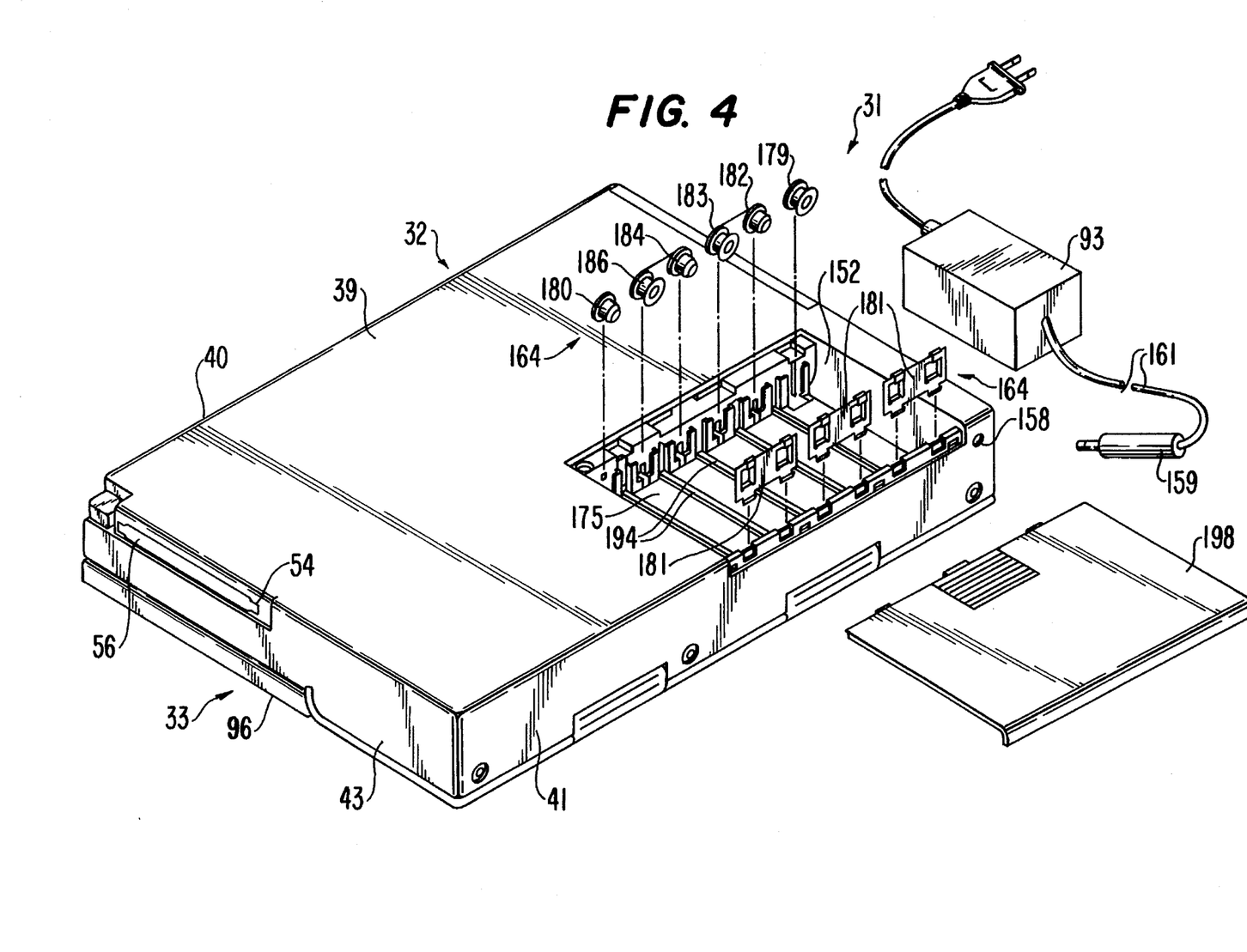
FIG. 4 is a partially exploded perspective view of the computer of FIG. 2.

With reference to FIGS. 1, 2, and 3, the self-powered portable computer, indicated as a shown by the reference 31, comprises a base unit 32, a lid 33 which is hinged onto the base unit 32 and can be positioned between a closed configuration and an open configuration, an electronic unit 34 housed inside the base unit 32, a keyboard 36 for controlling the electronic unit 34 and a display screen 37 carried by the lid 33.

The base unit 32 has a substantially parallelepipedal, somewhat flattened, shape and has an upper surface 38 which is horizontal in use, a bottom 39, a front part 40, a rear part 41, a right side 42 and a left side 43. The lid 33 has a front surface 44 and the screen 37 is of the flat type and covers most of the front surface 44. The lid 33, in its closed configuration, superimposes the surface 44 over the upper surface 38 of the base unit 32. In its open configuration, the lid 33 is substantially vertical, allowing access to the keyboard 36 and enabling the display screen 37 to be seen.

A mode indicator 46, for displaying characters and symbols indicating various operational states of the computer 31, is carried in the base unit 32. With regard to the lid 33, it comprises a viewing zone 47 in its lower part, external to the screen 37, so that the mode indicator 46 is still visible when the lid is in its closed configuration. Cables 45 in turn connect the electronic unit 34 inside the unit 32 to the screen 37, through a hinging zone between base unit 32 and the lid 33.

The computer 31 is very compact, of the palm held type, having base dimensions equivalent to those of a notebook of standard A5 format, i.e. approximately 210×148 mm and a thickness of approximately 32 mm in the closed configuration. The screen 37 is a 7" screen of the reflecting liquid crystal type, equivalent to an active area of approximately 141×106 mm and a graphics resolution of 640×400 dots. The mode indicator 46 has an active area of approximately 40×8.5 mm, enabling five graphic symbols and six alphanumeric characters to be displayed.

On its left side 43, the computer 31 comprises a slot 54 with a connector 56 for data and program exchange using a microprocessor (IC) card 57, for example of the PCMCIA 1.0/JEID4 4.0 type, conforming to standards. On its right side 42 also, the computer 31 comprises a parallel connector 58 and a series connector 59 (RS-232 type) for data exchange via external lines, with external peripherals or sources such as modems, display devices, printers and memory units. The connectors 58 and 59 can be covered with a small lid 60.

The electronic unit 34 comprises a central processing unit (CPU) 61, a main dynamic type memory (DRAM) 62, static type memories (SRAM) 63 and 64, read only memory (ROM) 66 and a programmable read only memory (PROM) 67. The unit 34 further comprises control circuits 68 and 69, for the screen 37 and for the data input/output lines respectively and a control and timing unit 71 for the memories 62, 63, 64, 66 and 67, for the control circits 68 and 69 and for the CPU 61.

The CPU 61 for example consists of an NEC V300HL microprocessor, operating at 16 MHz. The DRAM 62 has a memory of one MByte and the SRAMs 63 and 64 are dedicated to the screen 37 and to the external lines and have a capacity of 32 and 128 kBytes respectively. The control circuit 68 is for example of the 82C426 type and the control circuit 69 is of the PCB7310 type. The DOS programs are permanently recorded on the ROM 66, whereas the BIOS programs are permanently on the PROM 67.

The computer 31 also comprises a non-volatile bulk memory 83, for exchanging data with the electronic unit 34. This unit comprises for example a hard disk unit (HDU) 84, securely fitted inside the base unit 32. Some keys 35 on the keyboard 36 are preset to access bulk memory 83, and the mode indicator 46 has a bulk memory symbol which can be displayed to indicate that the bulk memory has been activated by the electronic unit 34.

A battery pack 87 comprising batteries 88 can be housed in the unit 32 and is capable of powering the electronic unit 34 via a power supply control circuit 89 in order to power the various functions of the computer 31. The control circuit 89 comprises a DC/DC converter 91 and a recharging control circuit 92 which is connected to the microprocessor 61 and defines reduced power and limited operational states of the computer 31 so as to limit energy consumption from the batteries 88 when some of the potential functions of the computer 31 are not being exploited.

The charging control circuit 92 is connected to a main switch 94 which projects from upper surface 38 of the base unit 32 and can be actuated when the lid 33 in its open configuration, in order to preset the electronic unit 34 for operational modes associated with the open configuration of the lid 33. The batteries 88 are rechargeable and the computer 31 can be connected to an external power unit 93 so as to operate on an external power supply.

The control circuit 92 also transmits signals to the mode indictor 46 so that it may display alphanumeric characters to represent the limited operational states preset by the circuit 92. A graphic symbol representing a battery can further be activated by the circuit 92 on the indicator 46 to display that there is an insufficient charge in the power supply.

The lid 33 has a surface 96, on the opposite side from the surface 44, which is accesible from the outside when the lid 33 is in the closed configuration. The surface 96 carries six presetting keys 97 which are connected to the electronic unit 34 via the cables 45 and can be actuated by an operator in order to preset some of the operational states of computer 31, when the lid 33 is in the closed configuration.

The computer 31 also comprises a voice input/output unit 101, selection means 102 for selecting a voice-command state of the abovementioned computer for processing vocal commands, and presetting means comprising the presetting keys 97 to preset the different operational conditions of the electronic unit 34 in the voice-command state.

The electronic unit 34 in turn comprises a conversion unit 107 to sample the analog signals coming from a microphone 103 in the voice input/output unit 101 in reply to the vocal commands received and convert them into digital signals which can be processed by other circuits in the same unit 34. The conversion unit 107 is also able to convert digital signals coming from other circuits in the electronic unit 34 into analog signals to be reproduced, as sounds, by a speaker 104 in the unit 101. The vocal commands, in the digital form as processed by the unit 104, are in turn stored in memory by the HDU unit 84, or by the IC card 57.

The presetting keys 97 comprise a PLAY key 116 to playback vocal commands, an FF key 117 to fast forward the point of play-back in the memory, a STOP key 113 to put the computer 31 into a state of rest, an RW key 111 to fast rewind the point of the play-back, a REC key 114 to record a vocal command from that point in the memory and a PAUSE key 112 to stop recording or play-back, in a way similar to the way in which a magnetic tape recorder/player is operated.

The batteries 88 in the battery pack 87 (FIGS. 3, 4, 5, 6, 7, 8, 9, 11 and 12) are located and enclosed in a case 151 which can be housed in a housing 152 in the base unit 32. The battery pack 87 comprises two terminals 153 and 154 which can be connected to two power supply conductors 156 and 157 to power the power supply control circuit 89 and the electronic unit 34, via two input terminals.

A socket 158 connected to external power supply conductors 166 and 167 can be connected, via a conventional jack plug 159 and a cable 161, to the external power unit 93 in order to power the power supply control circuit 89. The conductors 157 and 167 are connected to a common earth for the various circuits of the electronic unit 34.

The charging control circuit 92 also comprises a recharging circuit 160 which can generate the recharging current for the batteries 88 when the control circuit 92 is powered externally. A sensor device 162 can detect the presence of the case 151 in the housing 152, so as to make the circuit 160 recharging current available to the rechargeable batteries 88, through the conductors 156 and 157.

The housing 152 can also house a series of single, non-rechargeable, AA-size batteries 163, as an alternative to the case 151. Intermediate conductors, indicated as a whole by the reference 164, are located in the housing 152 and are suitably connected together so as to connect the non-rechargeable batteries 163 in series.

The power supply conductors 156 and 157 can in turn be connected to the opposite pole of the first and last batteries 163 in order to power the power supply control circuit 89 in the absence of the case 151. The sensor device 162, on the other hand, cannot detect the presence of the single batteries 163 and prevents hazardous attempts at recharging the non-rechargeable batteries 163.

The external power unit 93 and the batteries 88 or 163 are each connected via a diode, 168 and 169 respectively, to an input terminal 165 of the DC/DC conveter 91 and across the power supply conductors 166 and 156. The sensor device 162 controls a microswitch 170 which is connected between the charging control circuit 92 generator 160 and the power supply conductor 156, which in turn is connected to the rechargeable batteries 88.

The device 162 in particular consists of a lever for controlling the microswitch 170, which lever can interact with a shoulder 171 on the case 151 so as to be closed when the case 151 is housed in the housing 152. When the power unit 93 is connected to the mains, it can recharge the set of batteries 88 via the recharging control circuit 92, through its current generator 160 and the microswitch 170.

Figure 5:
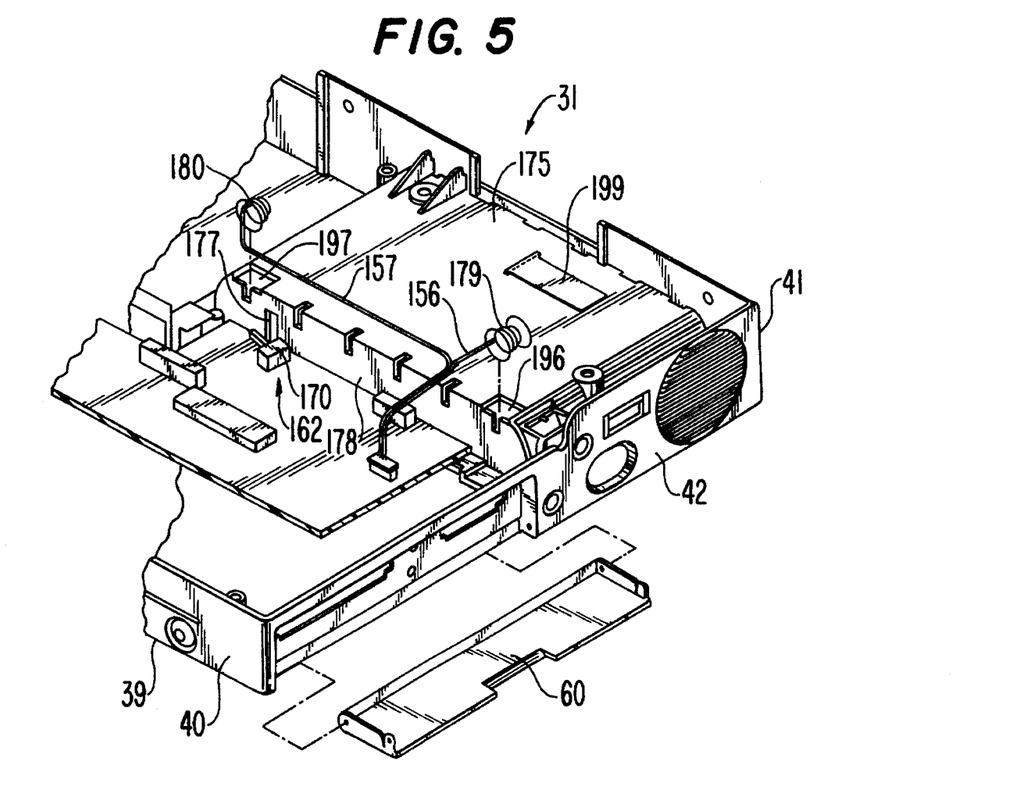
FIG. 5 is a partial perspective view of certain details of the computer of FIG. 1, to a different scale.

The case 151 consists of a plastic body which is parallelepipedal in shape and hollow in order to house the rechargeable batteries 88. The batteries 88 are cylinder NiCd batteries, substantially AA-size, and have a positive pole formed by a projecting cap and a negative pole formed by a metal base.

There are six batteries 88 housed in the case 151, side by side and in such a way that the positive pole of one battery is next to the negative pole of another battery. The six batteries 88 are connected together in series by five thin conductive strips 172, each of which is soldered between the projecting cap of one battery and the base of the adjacent battery, in a manner known per se.

The terminal 153 of the battery pack 87 consists of the projecting cap of the first battery 88 positioned at one end of the case 151 and the terminal 154 consists of the base of the last battery 88 positioned at the other end of the case 151. The two terminals 153 and 154 are arranged on the same face of the battery pack 87 and the case 151 comprises grooves 173 in which the conductive strips 172 which connect the rechargeable batteries 88 in series are housed.

Two through holes 174 and 176 enable the terminals 153 and 154 to make contact with the single springs 179 and 180 of the power supply conductors 156 and 157, which springs are shaped so as to make contact only with the projecting cap of the first battery 88 and the base of the last battery 88 respectively.

Figure 6:
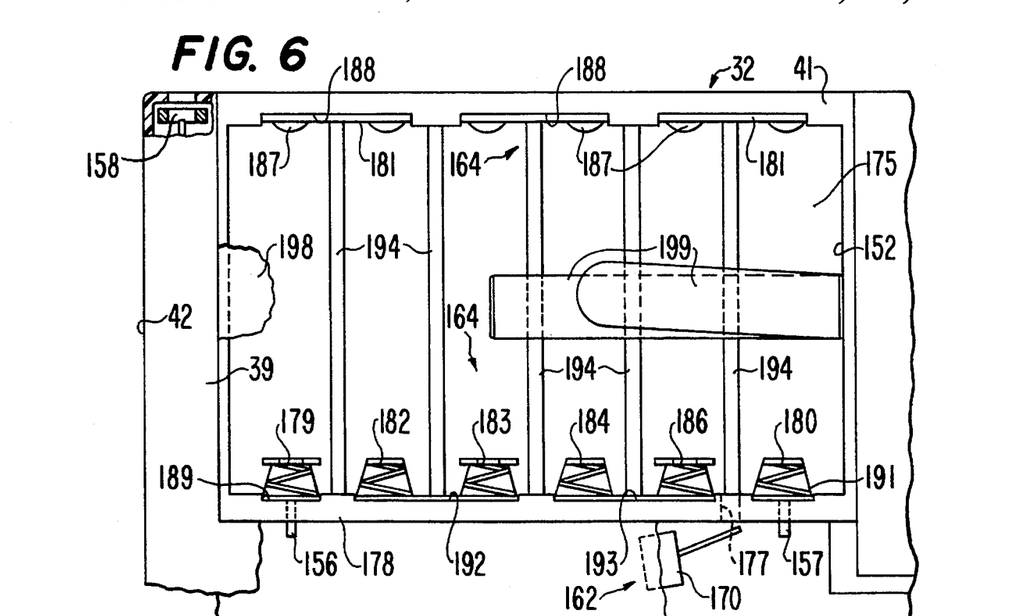
FIG. 6 is a partial plan view of the detail in FIG. 4, to a different scale.

The housing 152 of the base unit 32 is of rectangular cross section and is delimited by the rear wall 41, by an inner wall 178 which is parallel to the wall 41 and by a bottom 175. A slit 177 has been made in the wall 178, in front of the control lever of the microswitch 170. The shoulder 171 on the case 161 expediently consists of a peg 155 which has a rectangular cross section and projects from the same face as the through holes 174 and 176 in order to pass through the slit 177 in the wall 178 and actuate the microswitch 170.

The intermediate conductors 164 comprise three strip contacts 181 and four springs 182, 183, 184 and 186 which are connected together in pairs. The three strip contacts 181 are identical, each consisting of a metal strip having two small projecting plates 187 and are positioned in suitable grooves 188 in the rear wall 41. The grooves 188 are spaced apart from each other and the plates 18 project towards the inside of the housing 152. The two single springs 179 and 180 are in turn positioned in suitable grooves 189 and 191 arranged at each end of the inner wall 178.

The four springs 182, 183, 184 and 186 are electrically connected in pairs so as to make up two pairs of springs, each pair positioned in a groove 192, 193 of the inner wall 178. Furthermore, the springs 183 and 186 are shaped so that they make contact only with the positive poles of the batteries 163. The grooves 192 and 193 are spaced part from each other along the inner wall 178 and between the grooves 189 and 191 of the single springs 179 and 180.

The single springs 179 and 180, the double springs 182, 183 and 184, 186 project towards the inside of the housing 152 and, together with the plates 187 of the strips 181, connect the non-rechargeable batteries 163 in series in a manner known per se. The double springs 182, 183 and 184, 186 and the strip contacts 181 are inserted into the corresponding grooves 192, 193 and 188 directly into the housing 152. Whereas the single springs 179 and 180, which are permanently connected to the power supply conductors 156, 157 are inserted into the corresponding grooves 189 and 191 via two openings 196 and 197 made in the bottom 175 of the housing 152.

Figure 7:
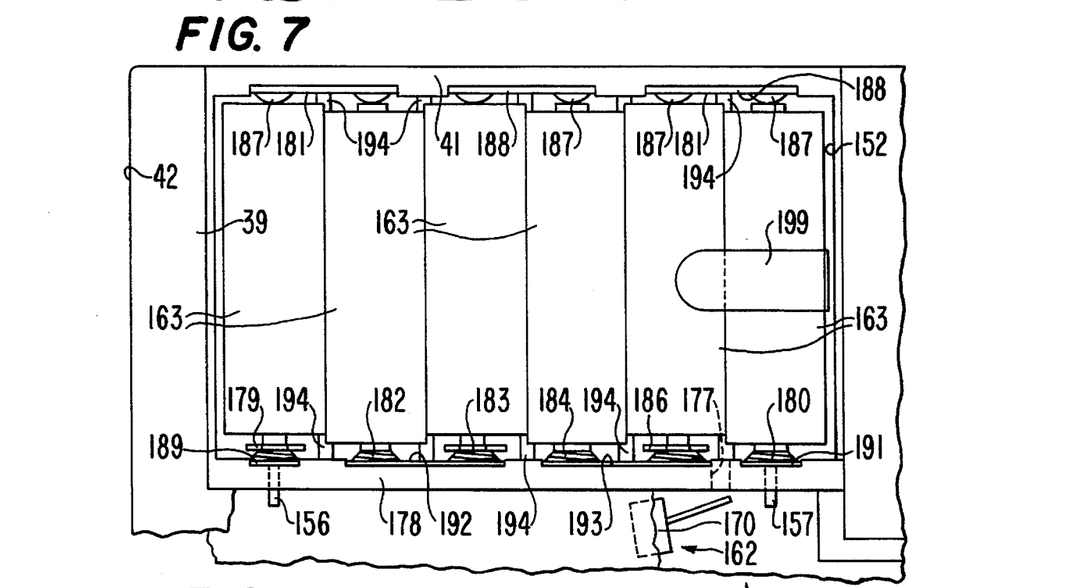
FIG. 7 is the same view as in FIG. 6, in a first working configuration.
Figure 11:
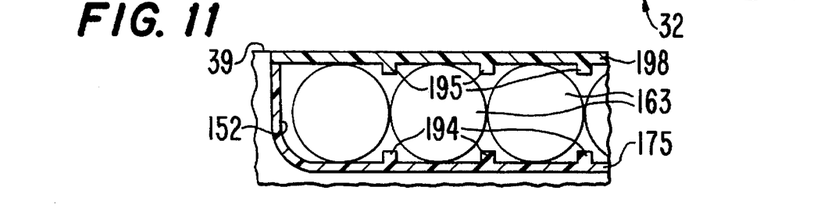
FIG. 11 is a partial front cross section of FIG. 7.

When the case 151 is positioned in the housing 152, the tensional force of the double springs 182, 183, 184, and 186 holds it against the plates 187 in a stable position. The case 151 isolates the batteries 88 and is integral with its rechargeable batteries 88; contact with the single spring 179 is solely via the cap terminal 153 and contact between the base terminal 154 and the other single spring 180 is via the hole 176. The housing 152 is usually closed by a conventional lid 198 which is removable.

Five ribs 194 on the bottom 175 of the housing 152 and five ribs 195 on the lid 198 facilitate alignment of the non-rechargeable batteries 163 and can also hold the battery pack 87 in position. A piece of tape 199 having a free end and an end fixed to the bottom 175, further facilitates removal of the batteries 163 or the pack 87, in a manner known per se.

The battery pack 87 has a nominal voltage of approximately 7.2 volts, whereas the series of non-rechargeable batteries 163 has a nominal voltage of approximately 9 volts. The external power unit 93 is of the standard type for use with 110 to 240-volt mains voltage and can supply a d.c. nominal output voltage of 12 volts. The power supply control circuit 89 is in turn able to operate correctly using the three different power supply sources: the battery pack 87, individual batteries 163 and the external power unit 93.

When the power unit 93 is connected to the socket 158 and is operational, the output prevails over that of the battery pack 87 or over that of the six batteries 163 optionally inserted in the housing 152, and the circuit 89 will be powered solely by the power supplied by the external power unit 93. The diode 169 prevents the power unit 93 from directly supplying current to the battery pack 87 or to the batteries 163, without any control being exerted by the recharging control circuit 92. In turn, the diode 168 prevents the battery pack 87 or the batteries 163 from supplying current to the external power unit 93 if, for example, it is not in use or it is broken.

The portable computer 31 described above can therefore be used in self-powered mode, with the set of rechargeable batteries 88 in the battery pack 87, with the batteries 163, or it can be powered externally from the external power unit 93 which can simultaneously recharge the rechargeable batteries 88.

If the portable computer 31 is to be powered using the battery pack 87, the following method of operation should be adopted. The lid 198 is removed and with one hand the case 151 is positioned keeping it slightly at an angle with the shoulder 171 in the slit 177. The peg 155 is inserted into the slit 177 and the case 151 is simultaneously lowered, so that it comes to be housed in the housing 152. The cap terminal 153 comes into contact with the single spring 179 and the other single spring 180, via the hole 176, comes into contact with the base terminal 154. Simultaneously, the shoulder 171 acts on the control lever which constitutes the sensor device 162 and closes the microswitch 170.

The case 151 is positioned in the housing 152 between the double springs 182, 183, and 184, 186 and the plates 187, and is held in place by the tensional force of the double springs 182, 183, and 184, 186. The housing 152 is closed by means of the lid 198, and the portable computer 31, powered from the current of the rechargeable batteries 88 via the diode 169 to the converter 91, is operational.

If the portable computer 31 is to be used with the power supply of the external power unit 93, all that needs to be done is to insert the jack plug 159 into the socket 158. The power unit 93 conveys the current via the diode 168 to the converter 91 and simultaneously conveys the current to the recharging control circuit 92. If the case 151 is housed in the housing 152, the recharging circuit 160 will also recharge the rechargeable batteries 88 via the microswitch 162.

Figure 8:
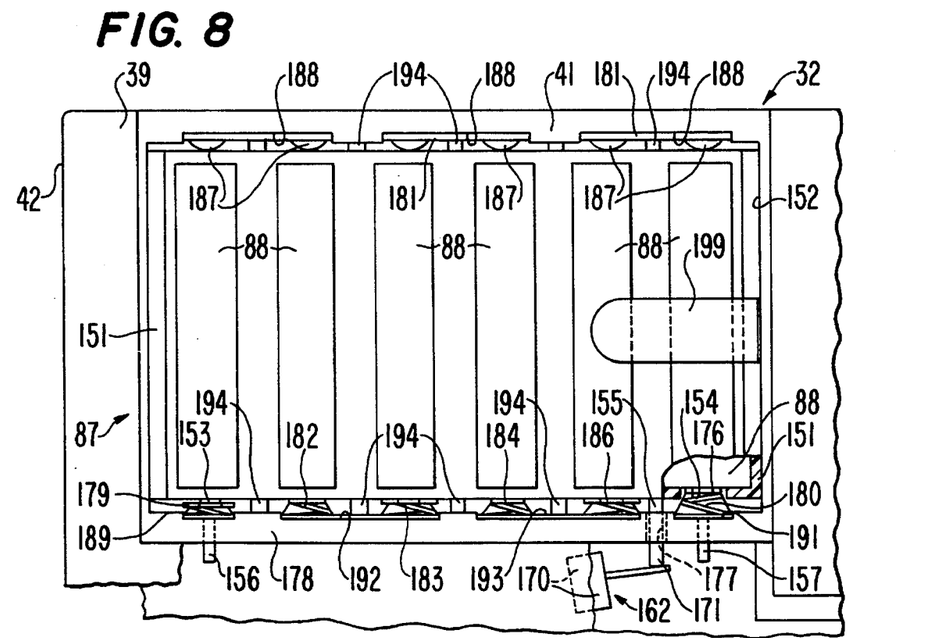
FIG. 8 is the same view as in FIG. 6, in a second working configuration.
Figure 9:
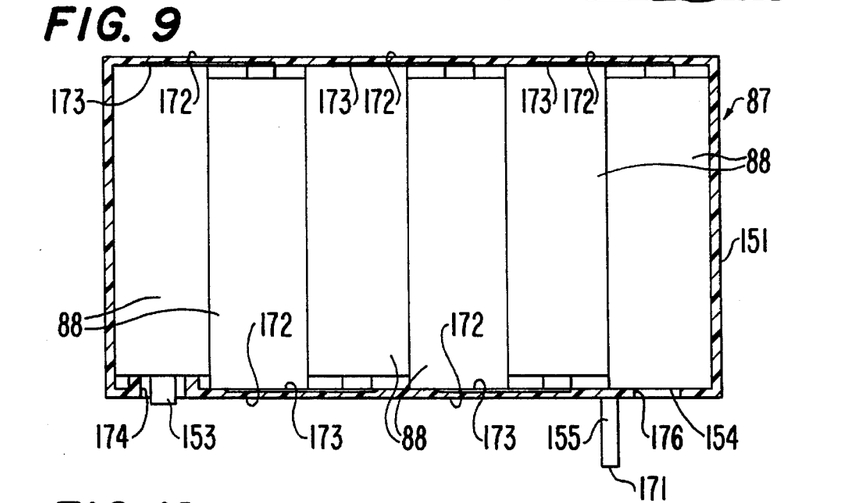
FIG. 9 is a plan view in partial cross section of a detail of FIG. 8.
Figure 10:
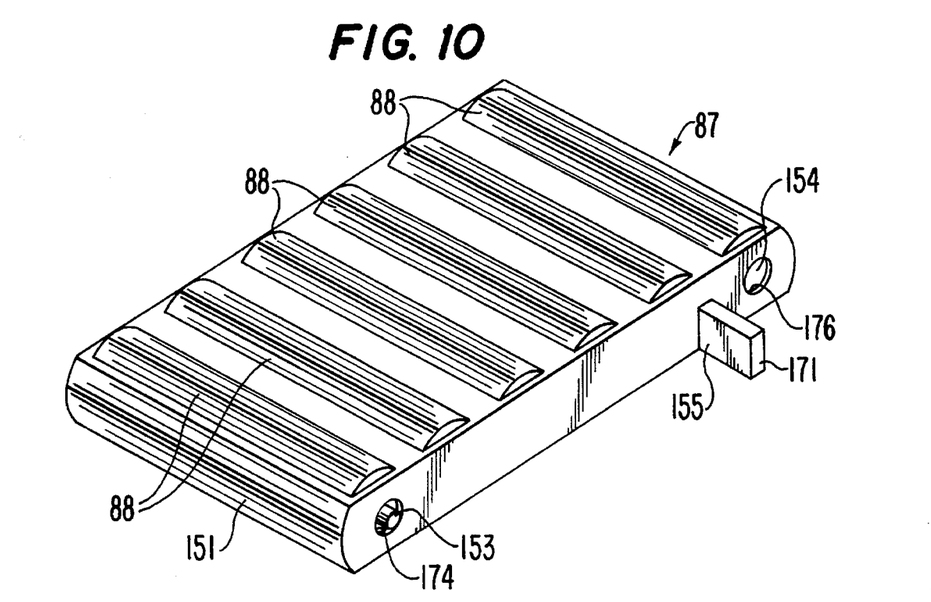
FIG. 10 is a perspective view of the detail of FIG. 9.
Figure 12:
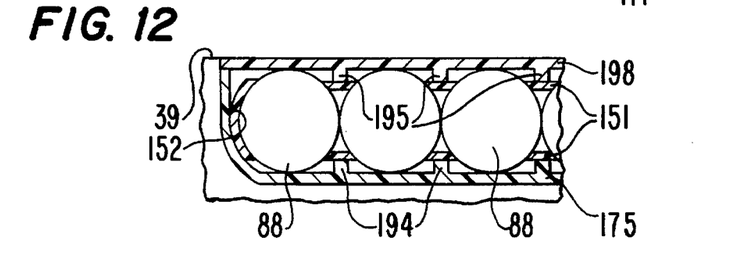
FIG. 12 is a partial front cross section of FIG. 8.

In the event that the batteries in the battery pack 87 have run down, and the portable computer 31 is to be used with the power supply of the non-rechargeable batteries 163, the following method of operation should be adopted. The lid 198 is removed and the tape 199 is pulled so as to disengage the case 151 from the housing 152, lifting it out. In addition, the peg 155 is pulled out of the slit 177 which results in the microswitch 170 being opened. The non-rechargeable batteries 163 are individually positioned inside the housing 152 between the plates 187 and the springs 179, 180, 182, 183 184 and 186. The housing 152 is closed by means of the lid 198 and the computer 31 is once again ready for use.

The microswitch 170 stays open, interrupting the circuit connecting the batteries 163 to the generator 160. If the portable computer 31 is to be powered with the external power unit 93, the jack plug 159 need merely be inserted into the socket 158. The computer 31 will operate on the external power supply, via the diode 168, without the batteries 163 being damaged by the recharging current.

As is clear from the above description, it is very simple to power the portable computer 31 and it is possible to transfer from one power supply to another quickly and easily.

The hard disk unit (HDU) 84 results adjacent to the battery housing 152 of the base unit 32. The unit 84 is of a thin profile type for disks of 2,5". A portion of the side 42 of the base unit 32 projects upwardly with respect to the keyboard plane 36 and the speaker 104 is lodged between the battery housing 152 and the projecting portion of the side 42 for a space optimization of the base unit 32.

It is understood that the portable computer 31, the case 151 with the set of rechargeable batteries 88, the housing 152, the intermediate conductors 164, the conductive strips 172 and the external power unit 93 may undergo various changes and improvements, with respect ot both shape and arrangements of the various parts, without departing from the scope of the present disclosure.

What I claim is:

1. A self powered portable computer comprising:

a base unit;

an electronic unit contained within said base unit and consisting of a plurality of electronic components;

two power supply conductors for said electronic unit;

a housing able to house a rechargeable battery pack of rechargeable batteries enclosed in a case;

two terminals in said housing connectable to said two power supply conductors to power said electronic unit;

a power supply control circuit connected to said power supply conductors to power said components;

a recharging circuit included in said power supply control circuit to generate a given recharging current;

a power socket for connection to a power unit outside said base unit to power said power supply control circuit and said recharging circuit; and a sensor device responsive to the presence of said rechargeable battery pack in said housing to supply said recharging current to said rechargeable battery pack;

wherein said housing is able to house a plurality of non-rechargeable batteries and said recharging current is prevented from being supplied to said non-rechargeable batteries;

wherein said recharging circuit is connected to said power supply conductors through a recharging current switching element which is controlled by said sensor device;

wherein said recharging current switching element comprises a microswitch, and the sensor device comprises a lever for controlling said microswitch, which lever interacts selectively with a shoulder on said battery pack so that said lever is activated by said shoulder and closes said microswitch, when said battery pack is housed in said housing;

wherein said lever is inactive when said non-rechargeable batteries are housed in said housing, whereby said microswitch is open; and wherein said external power unit recharges said rechargeable batteries contained in said battery pack through said recharging circuit and said microswitch; whereby said recharging current passes through said microswitch when said recharging current is supplied to said rechargeable battery pack and said recharging current is prevented by said microswitch from being supplied to said non-rechargeable batteries, when attempts at recharging said non-rechargeable batteries are made.

2. A portable computer according to claim 1, wherein said housing is delimited by a wall in which a slit is made;

wherein said control lever is aligned with said slit and is fit to engage with a peg projecting from said battery pack, through said slit; and wherein said housing carries intermediate conductors such as to suitably connect together non-rechargeable batteries.

3. A portable computer according to claim 2, wherein said housing is delimited by a rear wall, said intermediate conductors comprise strip contacts, each consisting of a metal strip having two small projecting plates, two single springs and springs connected together in pairs, wherein said strips are positioned in suitable grooves which are spaced apart from each other in the said rear wall with said plates facing inwardly of said housing, said two single springs are positioned in suitable grooves at each end of an inner wall and are connected to said power supply conductors, said springs connected together in pairs are positioned in suitable grooves which are spaced apart in the inner wall and between the two single springs, and wherein said springs all project forwardly of said housing so that, together with said strips, said springs connect said non-rechargeable batteries in series.

4. A battery pack for a portable computer according to claim 1, wherein said case consists of a hollow body which houses said rechargeable batteries and intermediate conductors are provided in said hollow body in order to connect said rechargeable batteries in series between said two terminals; and wherein said case is parallelepipedal in shape, said two terminals are arranged on one face of said case, and said case comprises a shoulder which projects from the said one face of said case on which said two terminals are arranged.

5. A battery pack in accordance with claim 4, wherein said housing is delimited by a rear wall, said intermediate conductors comprise, strip contacts each consisting of a metal strip having two small projecting plates, of two single springs, and of springs connected together in pairs, wherein said strips are positioned in suitable grooves which are spaced apart from each other in the said rear wall with said plates facing inwardly of said housing, said two single springs are positioned in suitable grooves at each end of an inner wall and are connected to said power supply conductors, said springs connected together in pairs are postioned in suitable grooves which are spaced apart in the inner wall and between the two single springs, and wherein said springs all project forwardly of said housing so that, together with said strips, they connect said non-rechargeable batteries in series, wherein said case is made of plastic and only the two terminals comes into electrical contact with said two single springs, each with a respective spring, when said case is positioned in said housing.

6. A portable computer comprising:
   a base unit;
   an electronic unit contained within the base unit and wherein the base unit comprises a battery housing able to house a battery pack for powering the electronic unit;
   a hard disk unit (HDU) operatively connected with said electronic unit;
   a keyboard for controlling the electronic unit;
   a voice input/output unit selectable for processing verbal anotations, said unit having a speaker for reproducing said verbal annotations; and
   a lid hinged on said base unit and which is fit to be superimposed to the keyboard in a closed configuration of said portable computer,
   wherein said disk unit is adjacent to said battery housing;
   wherein said hard disk is able to store said verbal annotations;
   wherein said base unit comprises a side wall having a portion projecting upwardly with respect to a keyboard plane;
   wherein said speaker is lodged in said base unit and is covered by said projecting portion for space optimization of the base unit; and
   wherein said projecting portion of the side wall is able to accommodate an edge of said lid and is flush with said lid in said closed configuration.

* * * * *